Figure 1:
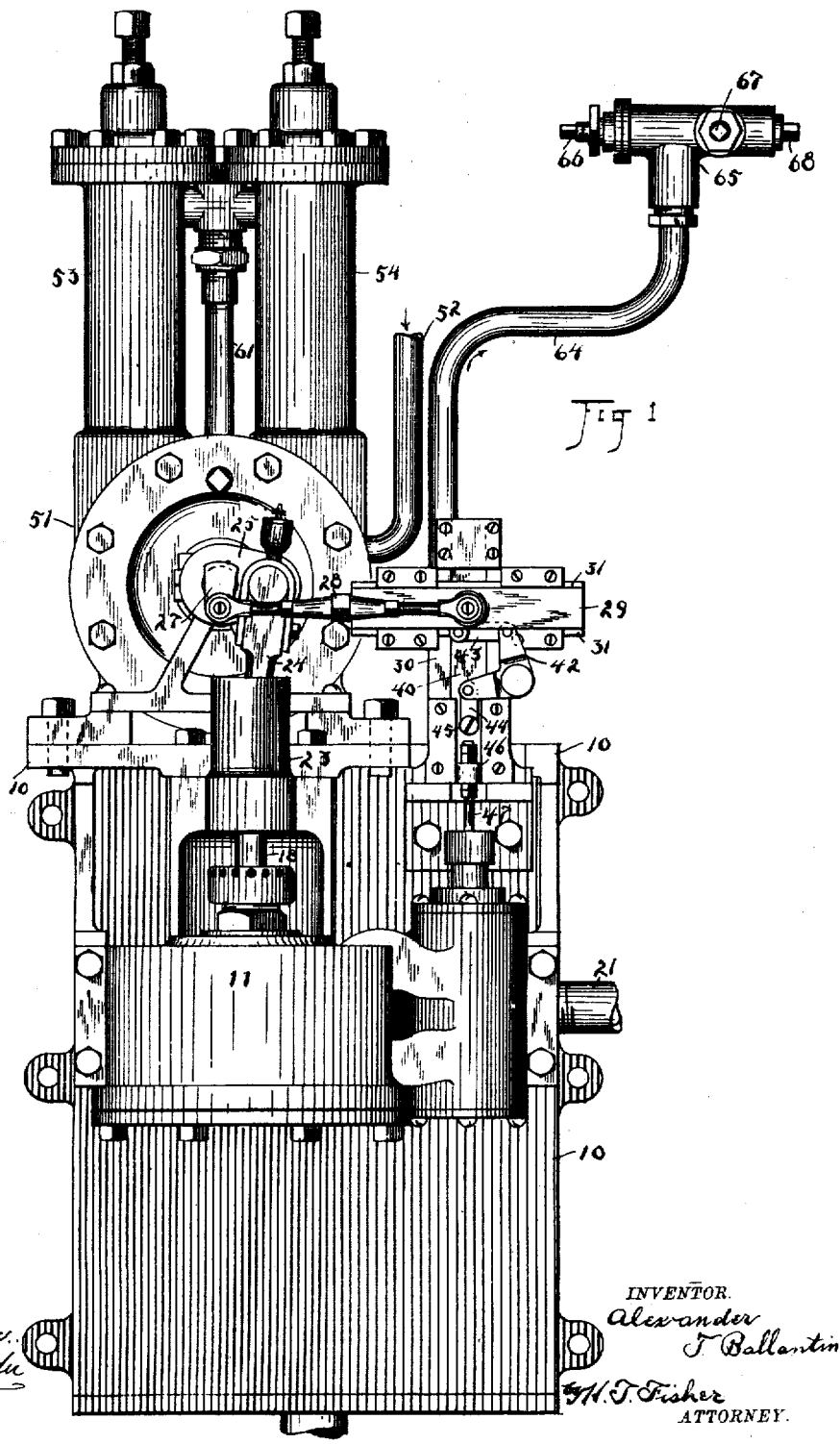

(No Model.) 9 Sheets—Sheet 1.

A. T. BALLANTINE.
PORTABLE OR DOMESTIC REFRIGERATOR.

No. 476,358. Patented June 7, 1892.

WITNESSES:
R. R. Moser
Victor Schmidt

INVENTOR.
Alexander T. Ballantine
by H. T. Fisher
ATTORNEY.

(No Model.)  9 Sheets—Sheet 2.

A. T. BALLANTINE.
PORTABLE OR DOMESTIC REFRIGERATOR.

No. 476,358. Patented June 7, 1892.

WITNESSES:
R. B. Moser.
Victor Schneider

INVENTOR.
Alexander T. Ballantine by H. T. Fisher ATTORNEY.

(No Model.) 9 Sheets—Sheet 3.
A. T. BALLANTINE.
PORTABLE OR DOMESTIC REFRIGERATOR.

No. 476,358. Patented June 7, 1892.

(No Model.) 9 Sheets—Sheet 4.
A. T. BALLANTINE.
PORTABLE OR DOMESTIC REFRIGERATOR.

No. 476,358. Patented June 7, 1892.

(No Model.) 9 Sheets—Sheet 6.

A. T. BALLANTINE.
PORTABLE OR DOMESTIC REFRIGERATOR.

No. 476,358. Patented June 7, 1892.

WITNESSES:
R. B. Moser
Victor Schneider

INVENTOR.
Alexander T. Ballantine
by H. T. Fisher ATTORNEY.

(No Model.) 9 Sheets—Sheet 7.
A. T. BALLANTINE.
PORTABLE OR DOMESTIC REFRIGERATOR.
No. 476,358. Patented June 7, 1892.
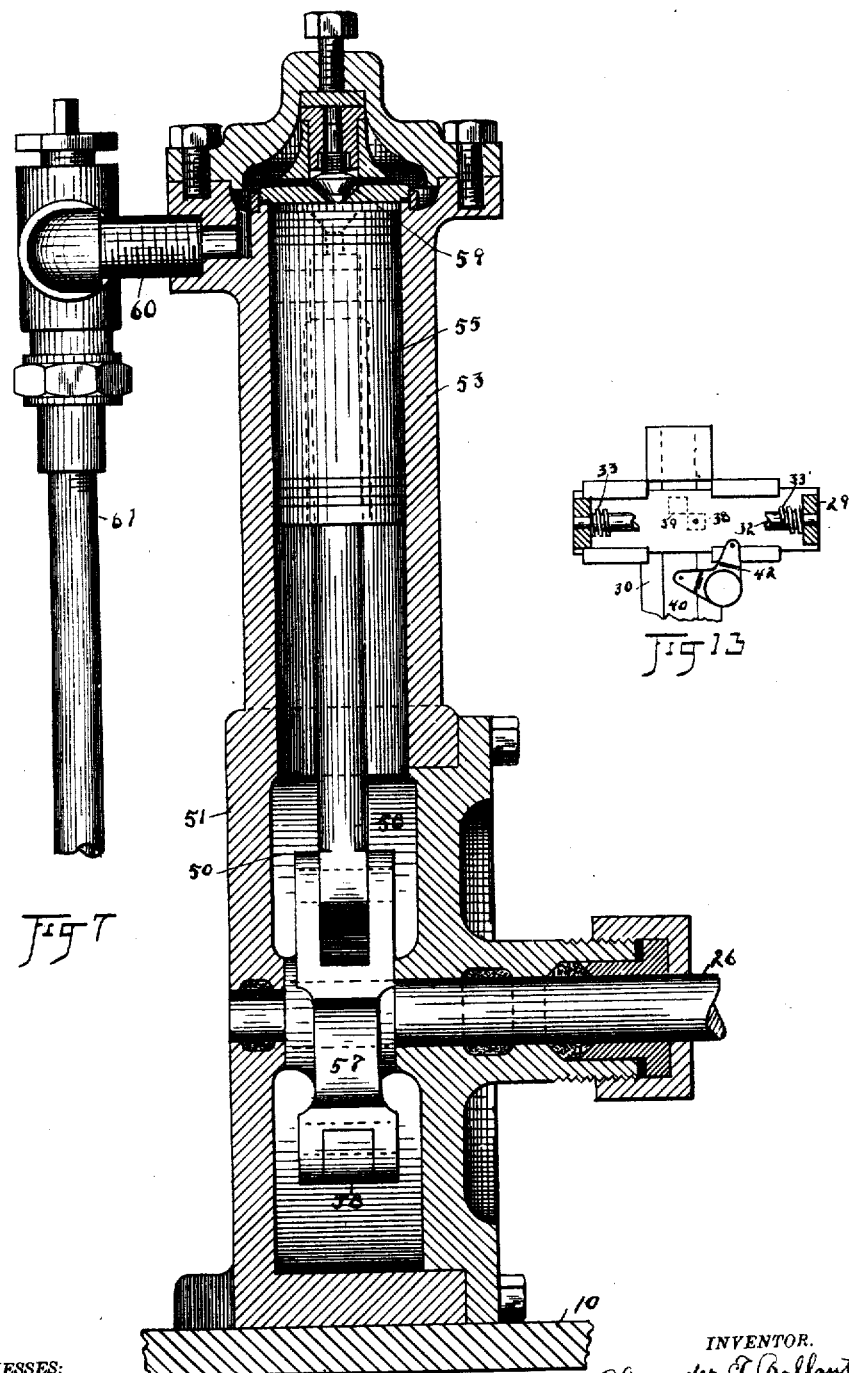
WITNESSES:
R. B. Moser.
Victor Schneider
INVENTOR.
Alexander T. Ballantine
H. T. Fisher ATTORNEY.

(No Model.) 9 Sheets—Sheet 8.
A. T. BALLANTINE.
PORTABLE OR DOMESTIC REFRIGERATOR.
No. 476,358. Patented June 7, 1892.
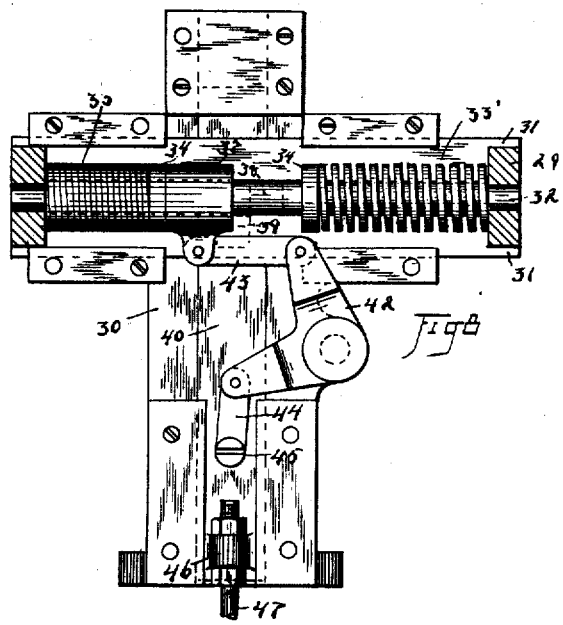
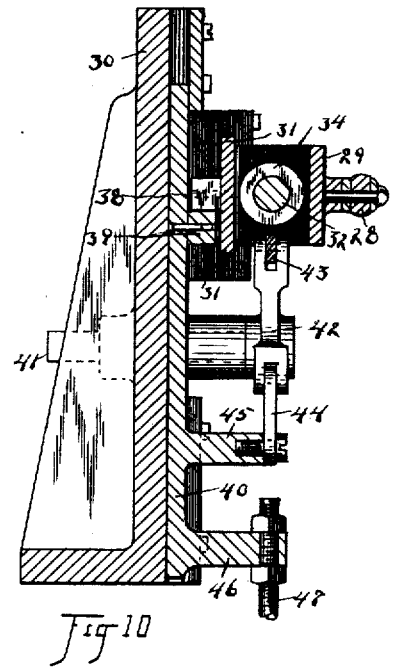
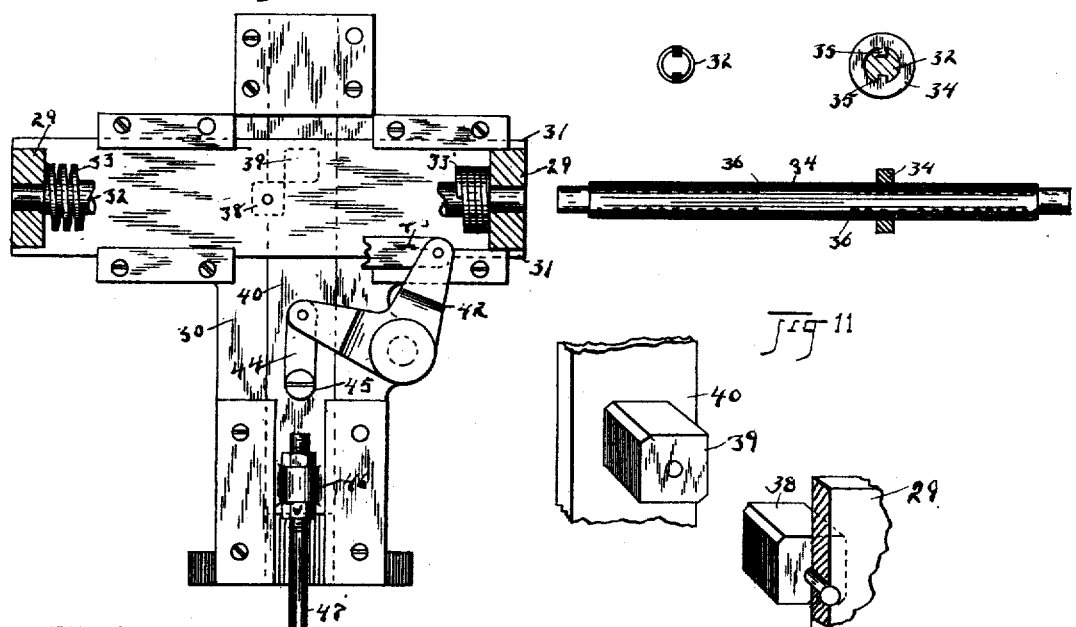
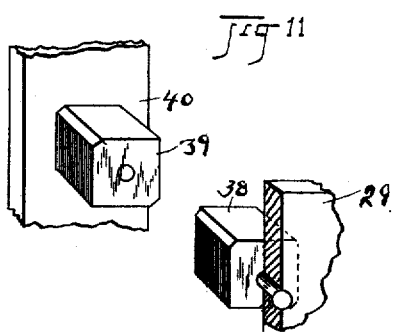
WITNESSES:
R. B. Marr
Victor Schneider
INVENTOR.
Alexander T. Ballantine
by H. T. Fisher ATTORNEY.

(No Model.)
9 Sheets—Sheet 9.

A. T. BALLANTINE.
PORTABLE OR DOMESTIC REFRIGERATOR.

No. 476,358.  Patented June 7, 1892.

WITNESSES:
R. A. Moser.
Victor Schneider

INVENTOR,
Alexander T. Ballantine
By H. T. Fisher ATTORNEY.

UNITED STATES PATENT OFFICE.

ALEXANDER T. BALLANTINE, OF CLEVELAND, OHIO, ASSIGNOR TO THE DOMESTIFROID COMPANY, OF SAME PLACE.

PORTABLE OR DOMESTIC REFRIGERATOR.

SPECIFICATION forming part of Letters Patent No. 476,358, dated June 7, 1892.

Application filed April 2, 1891. Serial No. 387,363. (No model.)

*To all whom it may concern:*

Be it known that I, ALEXANDER T. BALLANTINE, a citizen of the United States, residing at Cleveland, in the county of Cuyahoga and State of Ohio, have invented certain new and useful Improvements in Portable or Domestic Refrigerators; and I do hereby declare that the following is a full, clear, and exact description of the invention, which will enable others skilled in the art to which it appertains to make and use the same.

My invention has reference more especially to portable or domestic refrigerators in contradistinction to stationary refrigerators, which, besides being permanently located, are built on elaborate plans commensurate to their use.

My purpose is to provide an apparatus suitable for the family and other places where ice is generally used.

To these ends the invention consists in an apparatus operated by a motor, in this instance employing water-pressure from the city main, and a suitable refrigerant, like anhydrous ammonia, which under the processes of the machine is successively volatilized, compressed, and liquefied, all as hereinafter fully described, and particularly pointed out in the claims.

Figure 2:
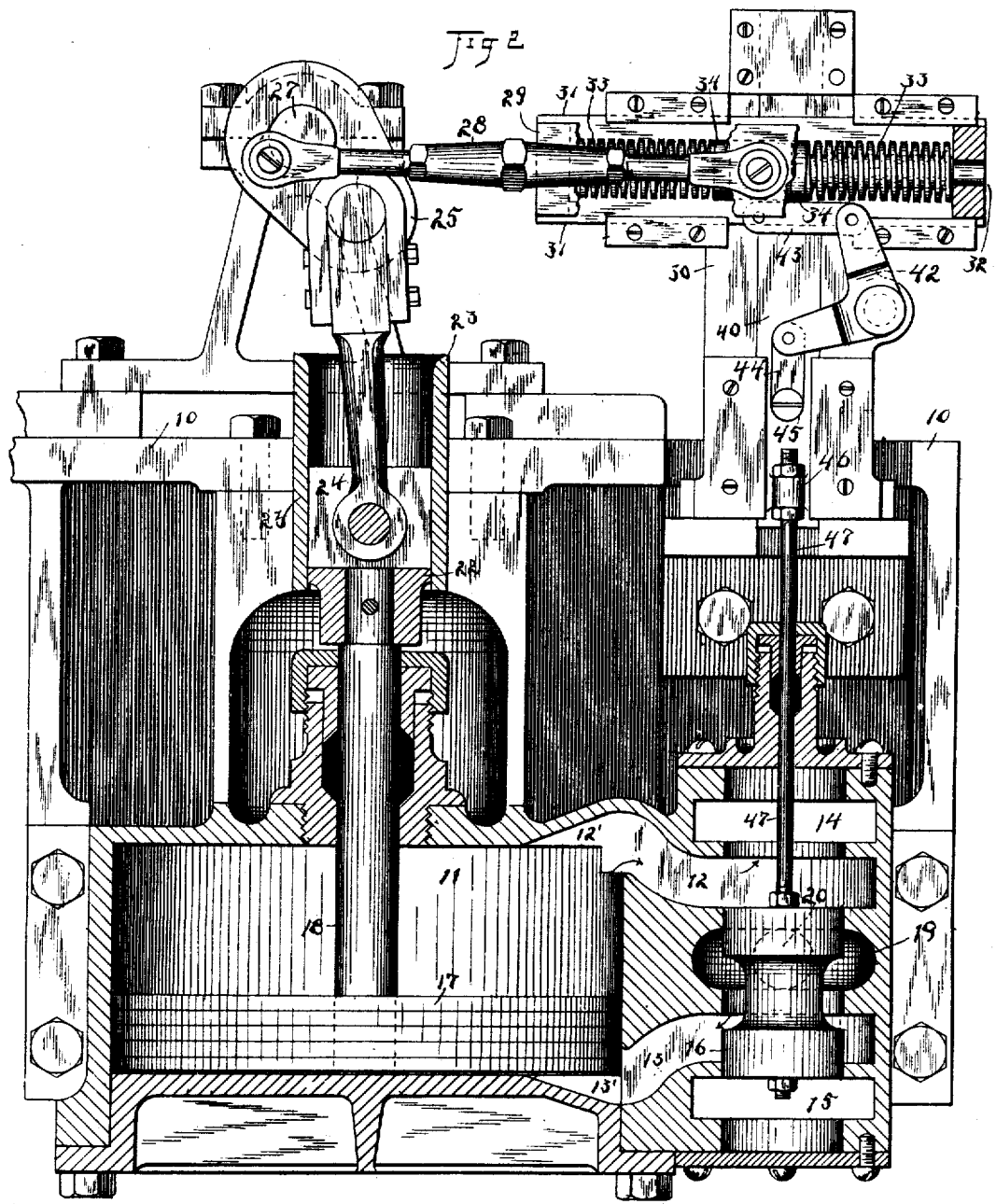
Figure 3:
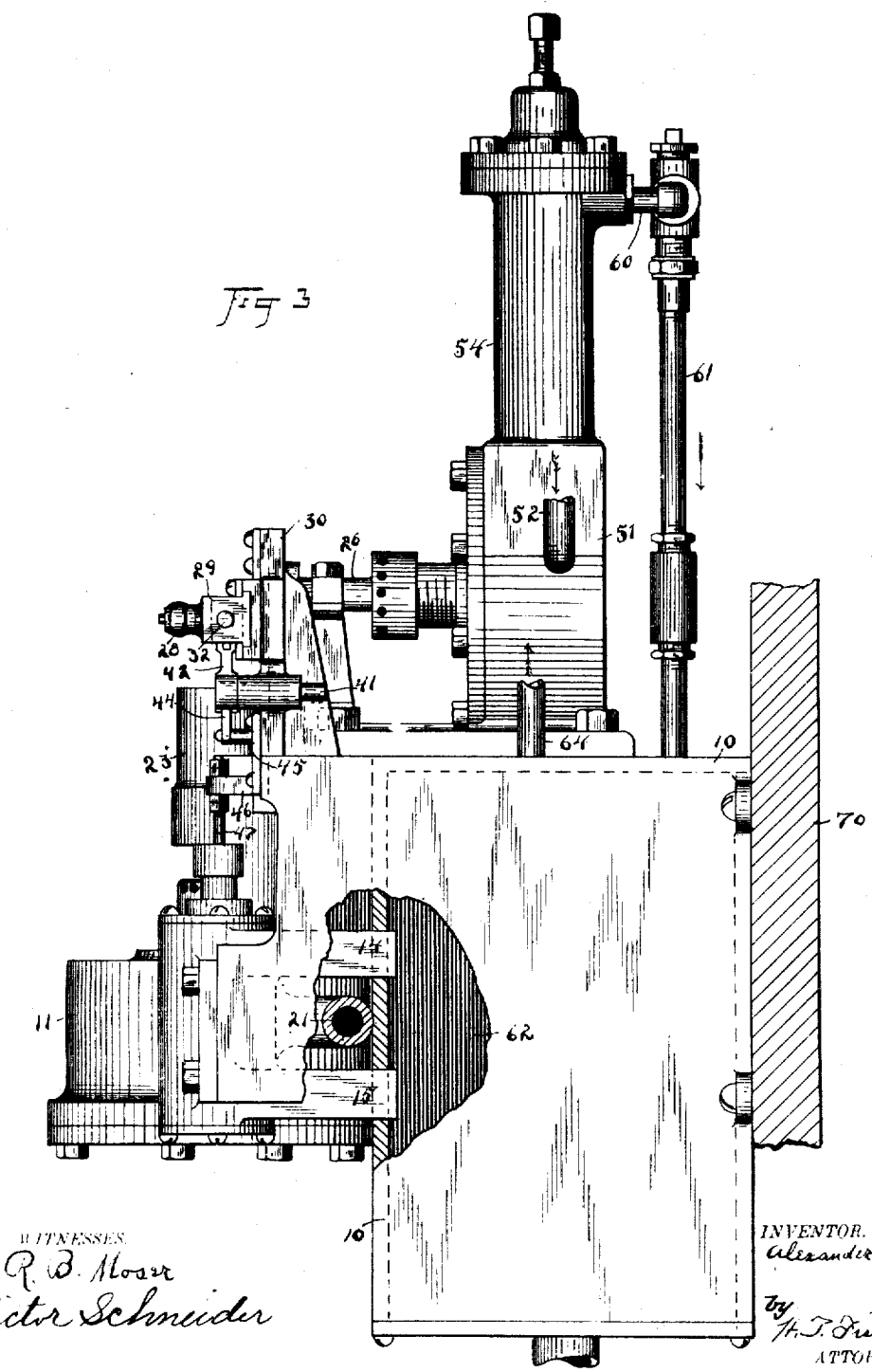
Figure 4:
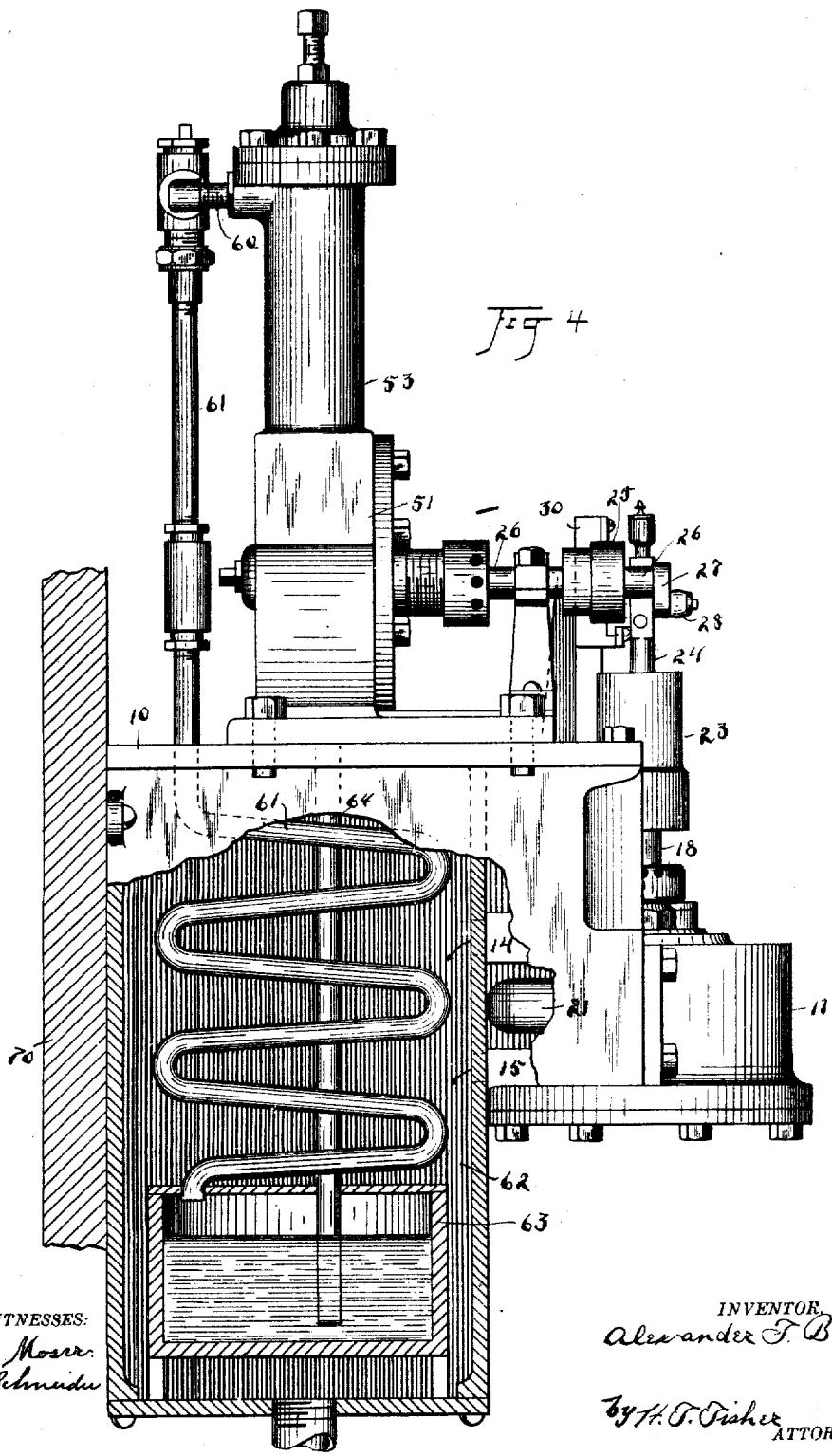
Figure 5:
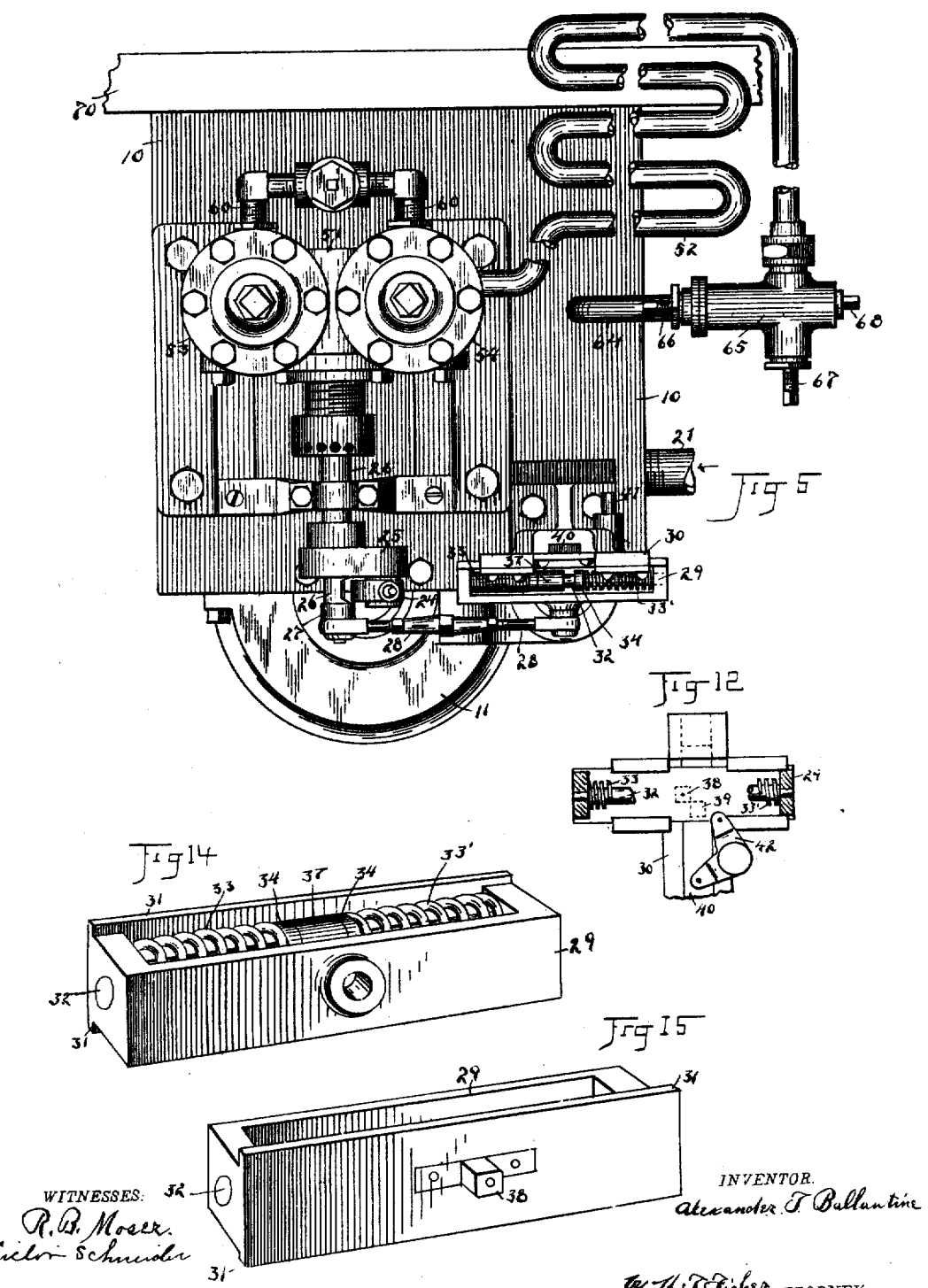
Figure 6:
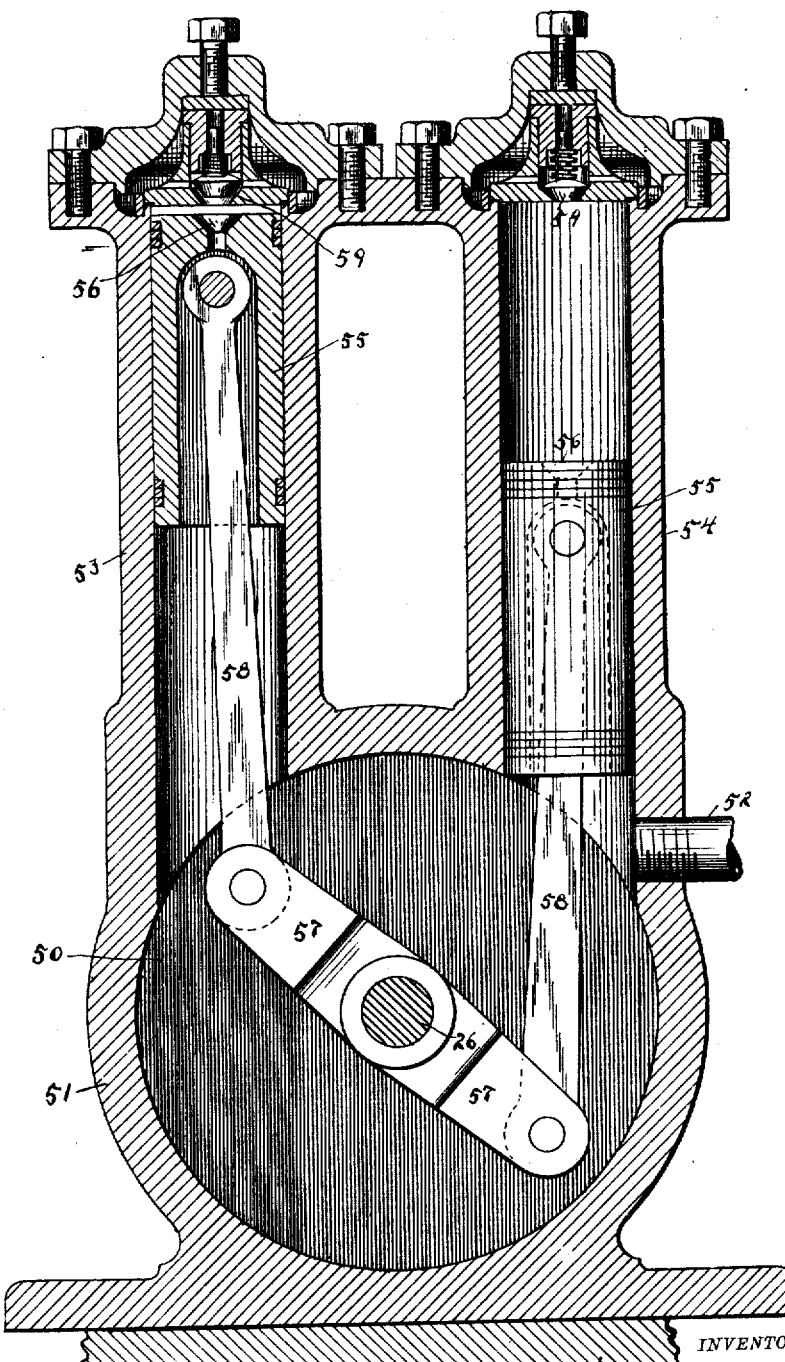
Figure 16:
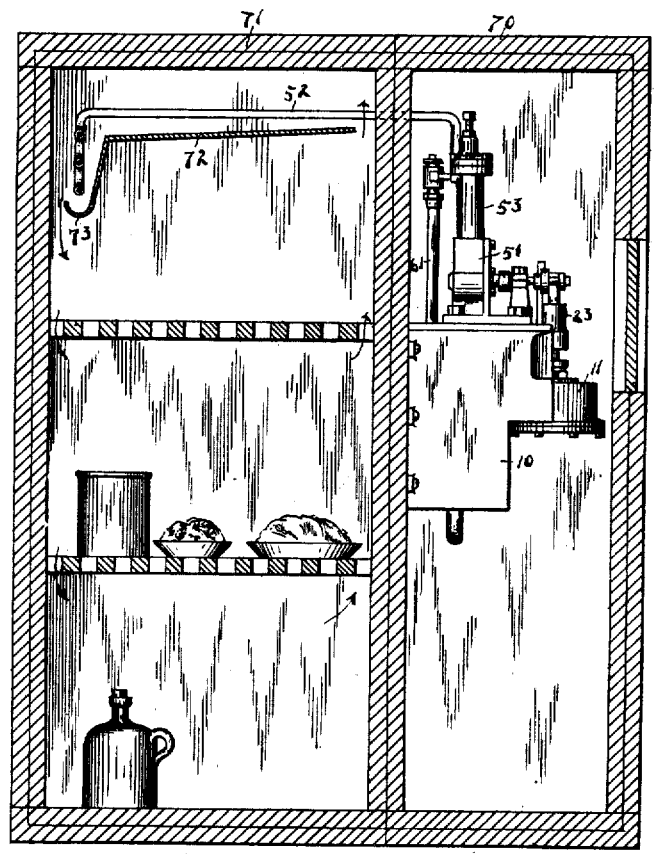
Figure 17:
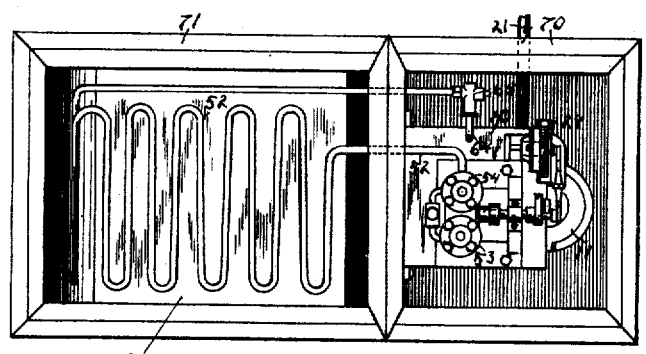

In the accompanying drawings, Figure 1 is a front elevation of my improved apparatus, omitting the refrigerating coil and box. Fig. 2 is a full-sized front elevation of the motor part of the apparatus with the inclosing case at the front broken out and sectioned, so as to disclose the interior of the motor and the fluid-channels, valve-bearings, and other operative parts. Fig. 3 is a side elevation of the apparatus, looking from the right of Fig. 1 and broken away to show the relation of the fluid parts to the condensing-chamber. Fig. 4 is a side elevation looking from the left of Fig. 1 and showing the opposite side to that shown in Fig. 3 and having the casing broken away to disclose the interior of the condensing-chamber in the bottom of the apparatus. Fig. 5 is a plan view of the whole apparatus with the cooling-coils broken apart and moved forward simply to show their relation to the other parts of the apparatus. Fig. 6 is a central vertical section of both pumps detached from the other parts of the apparatus; and Fig. 7 is a central vertical section of one of the pumps alone, taken at right angles to Fig. 6. Fig. 8 is a front elevation of the valve-operating mechanism with the motor connections removed, and Fig. 9 is a similar view in which the actuating-springs also are broken away to disclose the relation of the parts behind the same. Fig. 10 is a vertical central transverse sectional view of the valve-actuating mechanism, including the motor connections. Fig. 11 shows a group of details relating to the valve-operating mechanism, as elsewhere shown and described. Fig. 12, reduced, shows the locking lugs or projections, through which the position of the valve is controlled, in the position they occupy when the motor-piston and the valve reach the bottom of their stroke; and Fig. 13 shows the position of said lugs when the piston and valve are at the top of their stroke. Figs. 14 and 15 are front and rear views, respectively, of the spring-carrying box or carrier through which the valve is actuated, as hereinafter more fully described, both views being in perspective. Fig. 16 is a vertical section of a refrigerator-case, showing the refrigerating apparatus in connection therewith; and Fig. 17 is a plan view of said parts with the top cover of the casing removed.

The apparatus is reduced to the smallest practicable size consistent with the use for which it is intended, and its construction and operation are simplified, so as to bring the original cost within the reach of persons of ordinary means and to enable any one without the exercise of skill or special care to successfully and easily operate the same. As here shown, the apparatus comprises a reciprocating motor having fluid connection with the water-pipe leading into or through the building, a pump operated by the motor for compressing the refrigerating agent or gas, a cooler and condenser for the gas into which the motor is made to exhaust, a pipe connection for the liquid chemical from the condenser to the refrigerating-coil, whence the gas is conducted first to the pump, where it is compressed, and thence to the condenser, and the operation is automatic, constant, and uniform as long as the water-pressure is maintained.

The motor has a suitable casing 10, provided with a piston-chamber 11 and inlet and exhaust ports 12 and 13, entering said chamber at the top and bottom, respectively, from one side thereof. Between the outer portions of the said ports and extending above and below the same into the exit-ports is the valve-chamber containing a valve 16, which controls the flow of pressure fluid to both sides of the motor and the exhaust therefrom, the pressure and exhaust of course occurring alternately from opposite sides of the motor-piston.

The motor-piston 17 is of the reciprocating variety and is adapted to slide up and down in its chamber, guided centrally by the shaft 18, rigid therewith and sliding in a suitably-packed bearing above the chamber. A motor of this kind is deemed absolutely essential to the successful operation of the apparatus when hydrostatic pressure proceeding from the usual house service is employed, because it is the only form of motor that is reliable under all the attending circumstances of such service. Among these circumstances I have the wide fluctuations in pressure due to the opening of faucets or other use of the water throughout the building, which reduces the pressure in proportion to the water thus consumed. The opening of a single faucet will reduce the pressure more or less, and this reduction is perceptible to that degree in the reduced speed of the motor. The opening of several faucets at the same time may lower the pressure so much that the motor cannot overcome the resistance of the pumps, and hence will stop until sufficient pressure is restored. Now if a rotary motion were used the stopping would occur on the dead-center, as is the usual experience in that class of machines, and therefore it would follow, when the water-pressure was sufficiently restored for operation, that the motor would not start without personal help. If such help were required to carry it over exigencies liable to arise at any time and to frequently recur during the day, the motor would totally fail of its purpose and be practically worthless. Hence in devising the system of power herein employed I have anticipated the difficulties arising from varying motive pressure by providing a motor that has no dead-center point and which must inevitably and automatically start when sufficient pressure recurs and continue to run as long as such pressure remains.

The duration of suspension of pressure sufficient to run the motor is never liable to exceed a few moments, for the reason that, though several faucets may happen to be opened at the same time, they are not all liable to continue open longer than a few moments, and the machine will resume work just as soon as sufficient pressure is restored. Such temporary suspensions of work do not perceptibly affect refrigeration and may occur without detriment to the service.

The valve 16 may be either of the piston variety shown or of any other variety that will serve the purpose, and the valve-chamber has a central enlargement 19, in which is the fluid-inlet 20. (Shown in dotted lines behind the valve in Fig. 2 and by pipe connection 21 in Fig. 3.) The valve 16 is operated automatically by the motor-piston through the following mechanism: First, there is a head 22, fixed rigidly to motor-shaft 18 and sliding in a suitable guide 23. A pitman 24 connects the head 22 with a crank 25 on the rock-shaft 26, with which the pumps are connected. From this crank-shaft outside of crank 25, Fig. 5, is a crank 27 of less radius than crank 25 and connected by a rod 28 with a spring containing and compressing box 29, adapted to slide back and forth within given limits on the supporting-frame 30. The box 29 is oblong and has flanges 31 above and below at its rear sliding in suitable guideways on the fixed frame 30. Supported in the ends of the box 29 and extending centrally through the same is the spring-supporting rod 32, carrying two separate but equal springs 33 and 33', which at one end bear against the end of the box and at the other against a collar 34, loosely splined on the said rod, so as to slide thereon. The grooves in the rod 32, in which the interior projections 35 of the collars rest, terminate at 36 near the middle of the said rod, forming shoulders, beyond which the collars cannot slide, and this middle space on the rod is occupied by a sliding sleeve 37, which fills the said space when the two collars are in their normal position, as seen in Fig. 2.

Centrally on the back of the spring-carrying box 29 is a rectangular block or projection 38, rigidly fastened or cast thereon, and this projection is adapted to engage with a corresponding projection or block 39 on a vertically-sliding plate 40, set at right angles to the spring-box 29 and behind the same in frame 30. The engaging edges of the two blocks are beveled or rounded, and the upper and lower surfaces especially should be flat and parallel, so as to ride evenly one upon and over the other alternately from side to side.

At one side or edge of the frame 30 and on a pivot pin or bolt 41, extending outward therefrom, is pivoted a bell-crank lever 42, connected at its upper arm by a link 43 to ears on the sleeve 37 and at its lower arm by a link 44 with the vertically-sliding plate 40, the said plate being provided with a projection 45 for bringing such link connection into proper alignment with the other parts. At the bottom of the plate 40 is another forward projection 46, to which is adjustably secured the valve-operating rod 47. This completes the chain of connections extending from the motor to the valve 16, whereby the valve is operated. When the piston is down at the end of its downstroke, as in Fig. 2, the valve 16 also is down and in position to admit pressure fluid beneath the piston, and when the piston is at the end of its upstroke the position of the valve and the other connected parts are of course reversed.

The operation of this mechanism is as follows: Assuming that the piston is down, as in Fig. 2, the two springs 33 33' will be under their normal tension and the collars 34 and sleeve 37 will be at the center, as seen in Figs. 2 and 14. In this position of the parts the studs or blocks 38 and 39 are in the relation to one another shown in Fig. 12. Now the valve, the crank-lever 42, and the slide, with stud 39, will remain down, while the motor-piston rises to the limit of its upstroke. As the said piston rises, it carries the box 29 to the right, and in so doing compresses spring 33, because the stud 38 at the very outset of the movement begins to ride across upon the lug 39, and thus prevents the bell-crank and the parts to which its arms are connected from moving, while the lug 38 thus bears the lug 39 down. The spring 33 therefore compresses against sleeve 37 until the lugs reach the relation shown in Fig. 8, where the lug 38 is shown as just in the act of releasing the lug 39. When this occurs, the slide 40 is unlocked and the parts instantly fly to the opposite position. (Shown in Fig. 13.) In this movement under the pressure of spring 33 the valve 16 is instantly reversed, and the reversal is arranged to come precisely at the time the motor-piston reaches the limit of its upward stroke. Meantime the box 29 is carried to the right and the springs 33 33' are again under their normal tension and the collars and sleeve are at the center, as before. The studs 38 and 39 have, however, changed position, and the stud 39 is above and the stud 38 below, and their beveled corners are in juxtaposition. Now as the motor-piston descends, it carries the box 29 to the left, and at the very outset engages the said lugs, so as to prevent the slide 40 from going down until the time comes to reverse the valve 16. In doing this the lug 38 travels twice its width and until it just clears lug 39 at the left, when said lug and its slide are free to drop and carry all the parts into the lower position, as seen in Fig. 2, from which they originally started. In this instance the spring 33' does the work and the parts resume their normal positions. The box 29 stops first at the left and then at the right of the working center, and the lug 39 is first below and then above the lug 38. Both lugs alternate in positions, the lug 38 from right to left and the lug 39 up and down, according as the motor-piston is below or above in its chamber. This construction of valve mechanism does not only produce the desired reversal of the valve at exactly the right times, but it is instantaneous in its operation, so that the moment the motor-piston reaches the end of its stroke it is immediately put under the reverse pressure and its dead-water is exhausted. The exhaust-channels from both sides of the motor-piston are constructed and arranged with especial reference to getting this instantaneous effect on the piston the instant the valve is reversed, and to this end it will be seen that the channels or ports 12 and 13 are so curved and arranged with respect to the exits 14 and 15 that there will be more or less water left therein when the valve is reversed. It will be observed that the lower port has a downward curve from the valve-chamber to the piston-chamber and that the port extends inward a short distance at 13' beneath the piston to make an easy entrance for the water. This space in any event will be filled with water. A like construction with a reverse curve and inlet 12' is formed in the upper port 12; but in addition to this construction, which in any event retains more or less water in the ports 12 and 13 to help swell the inlet when pressure is turned on, a material and novel advantage is obtained by the simultaneous movements of the motor-piston and the valve, whereby the instantaneous reverse movement of the piston is produced the instant the valve opens either port to pressure. Thus suppose the piston to have just descended, as in Fig. 2, its speedy downward movement taxes the exhaust-channel to carry away the dead-water and said channel consequently is full. Now the instant the piston reaches the bottom the valve is reversed to the position shown in Fig. 2 and the reversal occurs with the space about the valve and the port 13 full of water. Hence there is no void space to be filled before the pressure is communicated to the piston, and hence action on the piston is instantaneous. The effect on the piston and through it to the pumps is equivalent to the constant movement of a rotary motor, and there is no halt or pause at the end of each stroke, as usually occurs when the motor fluid has to fill the ports before it can begin to act. The inlet-pipe 21 of course is provided with a suitable cock or valve (not shown) to turn the water on or off, as well as to control the flow and pressure. The exhaust is into the condensing-chamber, hereinafter described.

Referring now more especially to the refrigerating portion of the apparatus, I have first the set of pumps for compressing the gas after the same has been expanded in the refrigerating-coils and preparatory to its condensation. To this end I provide a receiving-chamber 50, formed within the casing or shell 51, into which the refrigerating or expansion coils 52 discharge, as seen in Fig. 6. The two pump-cylinders 53 and 54 open at the bottom into the said chamber 50, and are provided each with a cylindrical or other suitable piston 55, having a puppet-valve 56, through which the gas enters the cylinder in front of the chamber when the piston descends. The motor-shaft passes centrally through the chamber 50 and has packed bearings in the casing 51 to prevent the escape of gas. On the motor-shaft 26 in said chamber is a cross-arm 57, to the ends of which are connected the rods 58, which operate the pistons 55. In order that the pistons 55 and 55' may receive each a complete stroke at all times in order to expel all of the gas and thus prevent back-pressure, it is necessary that some means be provided to compensate for deficiencies in their throw, such as lost motion occasioned by wear of parts, &c., and to this end I make the connection 28 between the rock-shaft 26 and the valve capable of adjustment as to its length. In the drawings I have shown this adjustment as effected by dividing the rod 28 and connecting its parts by a turnbuckle or right and left threaded nut. The pump-cylinders are each provided at their upper ends with outlet-valves 59, through which the compressed gas is forced, and thence outward through elbow-pipes 60 into the stand-pipe 61. The lower portion of the compressed gas-conveying pipe 61 within the cooling and condensing chamber is fashioned into a coil, so as to expose a greater surface to the cooling influence than a straight pipe would afford. The condensing or cooling chamber 62 is a water-tight box built into the apparatus and receiving the exhaust from the motor through exits 14 and 15 and having an outlet in its bottom. Any suitable disposition of the pipe 61 may be made in this box that will serve to cool and condense the gas therein by means of the exhaust from the motor. It may be stated in this connection that the latent heat taken up by the gas through the refrigerating-coil 52 and on its way to the pump is rendered sensible by compression of the gas, and that therefore the gas must undergo a process of cooling before condensation or liquefaction can take place. This cooling of the gas is effected in the coil 61 and the refrigerant-receptacle 63, into which the said coil discharges. The receptacle and coil are alike exposed to the exhaust-water from the motor, and the quantity of liquid refrigerant used is equal, say, to two-thirds the capacity of the receptacle, so that the upper portion may be filled with gas under such pressure as will force the liquid through the pipe 64, dipping therein to the valved coupling-joint 65, Figs. 1 and 5. This coupling 65 is provided with two valves for controlling the flow of the liquid refrigerant and a plugged opening through which the liquid is received. The valve 66 serves to regulate the flow of the liquid into the coupling and to cut the flow entirely off when the apparatus is stopped or being replenished, and the valve 67 regulates the admission of the liquid into the expanding coil. Both valves preferably are of the needle pattern, and the liquid needs only a drop-by-drop admission into the expansion-coil to keep up an abundant supply of gas therein. Gasification of the liquid occurs instantly upon its entrance into said coil, and this conversion is accompanied by such a reduction of temperature that the coil of pipe quickly becomes covered with a heavy coating of frost its entire length, and this condition continues as long as the apparatus continues to operate.

In the outer end of the coupling-joint 65 is a screw-plug 68, which is removed when a fresh charge of refrigerant is introduced into the apparatus. When this is done, the valve 66 is closed and the valve 67 suitably opened, and the pumps are set to work to convey the refrigerant around to the receptacle 63.

In Fig. 16 I show a compartment refrigerator cabinet or casing which contains the entire apparatus. This casing may be in separate parts or jointly, as shall be desired. The compartment 70 contains the motor, pump, and other operative mechanism, and the compartment 71 is the refrigerator portion proper. The expansion-coil 52 is arranged in the top portion of the casing, and beneath it is a drip-pan 72, somewhat inclined toward one side and bent down and recurved at its edge, as shown at 73, to catch the drip from the pipe 52 and prevent its falling on the articles beneath. Any suitable or preferred arrangement of the coil may be made in the refrigerator-box—as, for example, the coil might extend along one side or the other or the like.

The operation of the apparatus will be understood from the foregoing description and need not be restated.

The advantage of the apparatus for domestic use, when compared with ice-refrigerators, is obvious. The apparatus being small and comparatively inexpensive, it comes practically within the reach of all, and once put in the expense of running it is really nominal, because a single charge of refrigerant, as anhydrous ammonia, which is preferred, costs but a few cents, and this charge endures for months without renewal.

The machine requires no care or attention whatever for months at a time and runs noiselessly day and night without cessation or interruption, except in the short intervals when the opening of faucets may temporarily lessen its speed or possibly stop the machine momentarily now and then during the day, as hereinbefore described.

The machines may be built larger or smaller, according to the service.

The process herein described involves, first, the forcing of the liquid refrigerant under gas-pressure produced by the pumps to the point where it is liberated drop by drop in the expanding and refrigerating coil; secondly, the natural volatilization of the liquid drops the instant they are liberated in the partially-exhausted refrigeration-coil; third, the compression of the gas by the pumps to render sensible the latent heat taken up by the gas, so that it may be eliminated, and, fourthly, the elimination of the heat in a suitable cooler, in which the gas is again converted into a liquid state.

Having thus described my invention, what I claim as new, and desire to secure by Letters Patent, is—

1. A refrigerating apparatus comprising a refrigerating-coil, a condenser, a refrigerant-receptacle and connecting-pipes, combined with a compressing-pump having cylinders and reciprocating pistons therein by which the spent gas is taken from the coil, compressed, and forced through the condenser and refrigerant-receptacle back to the coil, an oscillating arm with which the pistons are connected and by which they are operated, a rock-shaft on which the oscillating arm is secured, a hydraulic motor connected with the rock-shaft, a reciprocating valve for such motor, and adjustable connections between the said valve and the rock-shaft, by which the throw of the pump-pistons may be regulated so as to insure a complete stroke of each in order to expel all of the compressed gas.

2. In a refrigerator, a motor, and a pump, in combination with a condensing-chamber, a refrigerant-receptacle and a condensing-coil located in said chamber, a refrigerating-pipe arranged to discharge by gravity toward the pump, a feed-pipe extending from the refrigerant-receptacle to said refrigerating-pipe, and a valve to admit the refrigerant, located on a plane above the bottom of the pump, substantially as described.

3. In a refrigerator, a reciprocating pump to exhaust the refrigerating-coil and condense the refrigerant, a condensing-chamber and a refrigerant-receptacle therein, and a condensing-coil discharging by gravity into the top of said receptacle, a refrigerating-pipe arranged to discharge by gravity into the bottom of the said pump, a feed-pipe from the refrigerant-receptacle, connected with the refrigerating-pipe, and a controlling-valve at the point of union between said pipes, substantially as described.

4. In a refrigerator, a condensing-chamber, and a condensing-pipe and a refrigerant-receiver exposed to the water in said chamber, in combination with a hydraulic motor having a discharge-passage into said chamber to utilize the waste or exhaust motor fluid for condensing and cooling purposes, substantially as described.

5. In a refrigerator, a pump having a chamber in its bottom for the accumulation of gas and oil, a refrigerating-pipe discharging by gravity into said chamber, and a condensing-pipe on the pressure side of the pump, having a gravity discharge, in combination with a receptacle into which said pipe empties, a condensing-chamber inclosing said receptacle and condensing-pipe, and a feed-pipe with a valve connecting said receiver with the refrigerating-pipe, substantially as described.

6. In a refrigerating apparatus, a feed-pipe and a refrigerating-pipe, and a coupling uniting said pipes, having two separate valves to control the flow of refrigerating agent from one pipe to the other, and a plugged opening in said coupling for supplying the refrigerating agent, substantially as described.

7. A refrigerating apparatus comprising a refrigerating device, such as a coil of pipe, a refrigerant-receptacle from which the refrigerant is forced by accumulated pressure therein into the refrigerating device, a condensing-pump having a chamber below its pistons, into which chamber the spent gas from the refrigerating device is discharged and whence it is taken by the pump and compressed, a condensing and cooling chamber, above which the refrigerating device and the pump are arranged and in which is submerged the refrigerant-receptacle, a coiled pipe conveying the compressed gas from the pump through the condensing and cooling chamber into the refrigerant-receptacle, and a hydraulic motor whose waste water discharges into the cooling and condensing chamber, substantially as described.

Witness my hand to the foregoing specification this 13th day of March, 1891.

ALEXANDER T. BALLANTINE.

Witnesses:
H. T. FISHER,
N. L. McLANE.